United States Patent
Hart et al.

(10) Patent No.: US 8,412,175 B2
(45) Date of Patent: *Apr. 2, 2013

(54) CROSS DOMAIN NOTIFICATION

(75) Inventors: Steven R. Hart, Carlsbad, CA (US); Ty Lindteigen, Phoenix, AZ (US); Phil Mar, Carlsbad, CA (US); Christopher Paul Wren, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,388

(22) Filed: Aug. 17, 2012

(65) Prior Publication Data
US 2012/0317617 A1    Dec. 13, 2012

Related U.S. Application Data

(63) Continuation of application No. 12/896,794, filed on Oct. 1, 2010, now Pat. No. 8,270,963.

(51) Int. Cl.
  *H04M 3/00*    (2006.01)
(52) U.S. Cl. ............ 455/418; 719/315; 709/205; 726/22
(58) Field of Classification Search .................. 455/418; 709/223, 206, 229, 245, 205; 711/163; 718/108; 713/156; 719/315; 726/22
See application file for complete search history.

(56) References Cited

U.S. PATENT DOCUMENTS

| | | | |
|---|---|---|---|
| 5,210,874 A | 5/1993 | Karger | |
| 5,978,911 A | 11/1999 | Knox et al. | |
| 6,553,410 B2 | 4/2003 | Kikinis | |
| 6,957,286 B1 | 10/2005 | Cohen | |
| 7,941,813 B1 | 5/2011 | Protassov et al. | |
| 7,987,497 B1 | 7/2011 | Giles et al. | |
| 8,013,655 B2 * | 9/2011 | Herzer et al. | 327/333 |
| 8,270,963 B1 | 9/2012 | Hart et al. | |
| 2003/0191793 A1 * | 10/2003 | Dolin et al. | 709/103 |
| 2003/0224761 A1 | 12/2003 | Goto | |
| 2004/0049600 A1 | 3/2004 | Boyd et al. | |
| 2004/0107358 A1 * | 6/2004 | Shiakallis | 713/200 |
| 2004/0209609 A1 | 10/2004 | Kouznetsov et al. | |
| 2004/0225722 A1 * | 11/2004 | Jeong | 709/218 |
| 2004/0268345 A1 | 12/2004 | Lodwick et al. | |
| 2005/0039005 A1 | 2/2005 | Dyck et al. | |
| 2005/0204041 A1 * | 9/2005 | Blinn et al. | 709/225 |

(Continued)

OTHER PUBLICATIONS

General Dynamics C4 Systems. Sectéra® Edge™ Smartphone: Secure Mobile Environment Portable Electronic Device (SME PED). Retrieved Oct. 1, 2010 at http://www.gdc4s.com/content/detail.cfm?item=32640fd9-0213-4330-a742-55106fbaff32.

(Continued)

*Primary Examiner* — Mahendra Patel
(74) *Attorney, Agent, or Firm* — Kilpatrick Townsend & Stockton LLP

(57) ABSTRACT

A method for a mobile communication device to indicate activity associated with an operating domain includes establishing a plurality of operating domains for the mobile communication device each operating as an independent virtual machine. The method also includes providing a trusted indicator at the mobile communication device for indicating activity associated with a high-side domain. The method also includes providing an input on the mobile communication device for switching from a low-side domain to the high-side domain. The method also includes providing a trusted element for the mobile communication device that is independent of either the high-side domain or the low-side domain. The trusted element may be configured to receive a signal from the input for switching from the low-side domain to the high-side domain and to perform user authentication for switching from the low-side domain to the high-side domain.

15 Claims, 20 Drawing Sheets

U.S. PATENT DOCUMENTS

| | | | |
|---|---|---|---|
| 2005/0213763 | A1 | 9/2005 | Owen et al. |
| 2005/0250470 | A1 | 11/2005 | Wen et al. |
| 2006/0010314 | A1 | 1/2006 | Xu |
| 2006/0136590 | A1 | 6/2006 | Barrett et al. |
| 2006/0258342 | A1 | 11/2006 | Fok et al. |
| 2007/0072599 | A1 | 3/2007 | Romine et al. |
| 2007/0113066 | A1 | 5/2007 | Samba et al. |
| 2007/0280509 | A1 | 12/2007 | Owen et al. |
| 2008/0005794 | A1* | 1/2008 | Inoue et al. ............... 726/22 |
| 2008/0034423 | A1 | 2/2008 | Durix et al. |
| 2008/0313648 | A1 | 12/2008 | Wang et al. |
| 2009/0089569 | A1 | 4/2009 | Baribault et al. |
| 2009/0113458 | A1 | 4/2009 | Finger et al. |
| 2009/0276835 | A1* | 11/2009 | Jackson et al. ............... 726/4 |
| 2009/0328204 | A1* | 12/2009 | Taoka ............... 726/22 |
| 2010/0132015 | A1 | 5/2010 | Lee et al. |
| 2010/0174921 | A1 | 7/2010 | Abzarian et al. |
| 2010/0279675 | A1 | 11/2010 | Slack et al. |
| 2011/0010543 | A1 | 1/2011 | Schmidt et al. |
| 2011/0162038 | A1 | 6/2011 | Chunilal |

OTHER PUBLICATIONS

General Dynamics C4 Systems. Sectéra® Wireless GSM® Phone: End-to-end Voice and Data Security for GSM Wireless Networks, retrieved Oct. 1, 2010 at http://www.gdc4s.com/content/detail.cfm?item=97aef0a4-96e4-4ab2-b33b-eb832c4bb4c2.

General Dynamics C4 Systems. TVE for Desktops and Laptops: Simultaneous View of Multiple Security Levels on a Single Computer. Retrieved Oct. 1, 2010 at http://www.gdc4s.com/content/detail.cfm?item=35a995b0-b3b7-4097-9324-2c50008b3a75.

Green Hills Software. Leading the Embedded World: Integrity Secure Virtualization, retrieved Oct. 1, 2010 at http://www.ghs.com/products/rtos/integrity_virtualization.html.

Heiser, Gernot, et al., Technology White Paper: The Motorola Evoke QA4, a Case Study in Mobile Virtualization, pp. 1-10, Jul. 22, 2009, Open Kernel Labs, Inc., Chicago, IL.

Hwang, Joo-Young, et al., Xen on ARM: System Virtualization using Xen Hypervisor for ARM-based Secure Mobile Phones, pp. 257-261, This full text paper was peer reviewed at the direction of IEEE Communications Society subject matter experts for publication in the IEEE CCNC 2008 proceedings.

L-3 communications. L-3 Guardian: SME PED, Business Development: Mark Alphonso, Last modified: Sep. 2, 2009, retrieved Oct. 1, 2010 at http://www.l-3com.com/cs-east/ia/smeped/ie_ia_smeped.shtml.

McAfee Mobile Security: Keep your mobile workforce agile and portable data secure by safeguarding any data on any device retrieved Oct. 1, 2010 at http://www.mcafee.com/us/enterprise/solutions/mobile_security/index.html.

McAfee Secure Virtualization: Proven, comprehensive protection for both physical and virtual environments, retrieved Oct. 1, 2010 at http://www.mcafee.com/us/enterprise/solutions/system_protection/secure_virtualization.html.

RSA, The Security Division of EMC. Secure Virtualization and Cloud: Build a Secure Foundation for your Virtualization Journey, retrieved Oct. 1, 2010 at http://www.rsa.com/node.aspx?id=1212.

Non-Final Office Action of Oct. 27, 2011 for U.S. Appl. No. 12/896,782, 15 pages.

Non-Final Office Action of Feb. 22, 2012 for U.S. Appl. No. 12/896,794, 16 pages.

Applicant-Initiated Interview Summary of Apr. 10, 2012, for U.S. Appl. No. 12/896,794, 4 pages.

Notice of Allowance of May 18, 2012 for U.S. Appl. No. 12/896,794, 11 pages.

Non-Final Office Action of Jun. 18, 2012 for U.S. Appl. No. 12/896,748, 16 pages.

Non-Final Office Action of Nov. 2, 2012 for U.S. Appl. No. 12/896,770, 24 pages.

* cited by examiner

Fig. 3 - Smartphone (Commercial)

| Switched | Shared | Assigned Low | Assigned High |
|---|---|---|---|
| Speaker | Cell Data Network | USB | GPS |
| Microphone | WiFi Network | Bluetooth | |
| Display | Flash Storage | | |
| Keypad | Motion Gyros | | |
| Touch Screen | Digital Compass | | |
| Camera | Accelerometer | | |

Fig. 12

CROSS DOMAIN NOTIFICATION

CROSS-REFERENCE TO RELATED APPLICATIONS

This application is a continuation of Ser. No. 12/896,794, now U.S. Pat. No. 8,270,963, filed Oct. 1, 2010, the contents of which are incorporated herein by reference in their entirety for all purposes.

FIELD OF THE INVENTION

The present invention relates generally to mobile communication devices. More particularly, the present invention relates to methods and apparatus for providing mobile communication devices that operate in multiple isolated domains that provide differing levels of security and reliability.

BACKGROUND OF THE INVENTION

Communication systems play an important role in government, business and personal settings, each with their own unique set of requirements that sometimes overlap and sometimes conflict. In government settings, there is often a need to handle sensitive communications in a secure manner and the communication devices need to be reliable and resistant to unauthorized modification. Traditionally this is accomplished with special purpose hardware and systems that can be very expensive to develop, deploy and maintain.

In business settings, a firm or business entity may wish to provide employees with cell phones to conduct business related transactions. The business entity might prefer to separate business use of the phone from personal use for a variety of reasons. These may include the avoiding expenses incurred from personal calls, the potential embarrassment of having certain types of inappropriate personal use associated with the business entity, and the risk of downloading mal-ware that might be embedded in applications freely available on the internet.

In personal settings, users would like to enjoy the freedom to make calls and download applications of any type without restrictions, while still knowing they can rely on the phone for business use even if problems arose as a result of personal use activity.

BRIEF SUMMARY OF THE INVENTION

What is needed, therefore, is the ability to modify or otherwise use an existing commercial off-the-shelf smartphone without hardware modification in a manner that provides multiple user domains, each with differing levels of security and reliability, and wherein each domain is isolated from the other.

In embodiments of a smartphone configuration according to the present invention, a commercial off-the-shelf smartphone may be adapted through software modification techniques to provide multiple operating modes or domains that provide differing levels of security and reliability. According to one embodiment of the invention, the adaptation involves a provisioning process where previously installed software is cleared from the device and new trusted software is installed.

Cross domain activity notification may be provided through trusted indicators. A user operating in one domain may be notified of the arrival of email or an incoming phone call from another domain and given the opportunity to switch domains using appropriate access control methods to insure domain switching is not spoofed by unauthorized intrusion software or technique.

In accordance with an embodiment of the invention, a method for a mobile communication device to indicate activity associated with an operating domain includes establishing a plurality of operating domains for the mobile communication device each operating as an independent virtual machine. At least one of the operating domains may be a high-side domain and at least one of the operating domains may be a low-side domain. The method also includes providing a trusted indicator at the mobile communication device for indicating activity associated with the high-side domain. The activity may include at least one of an incoming call, an incoming text, or a new email message. The trusted indicator may be configured to activate a user notification to indicate the activity. The method also includes providing an input on the mobile communication device for switching from the low-side domain to the high-side domain. The input may be configured as an input only device that is activated by user input. The method also includes providing a trusted element for the mobile communication device that is independent of either the high-side domain or the low-side domain. The trusted element may be configured to receive a signal from the input for switching from the low-side domain to the high-side domain and to perform user authentication for switching from the low-side domain to the high-side domain. The user authentication may include providing output authentication information from the trusted element to an output device and receiving input authentication information at the trusted element from an input device.

In an embodiment, the user notification activated by the trusted indicator is a light emitting diode (LED) on the mobile communication device.

In another embodiment, the input on the mobile communication device for switching from the low-side domain to the high-side domain includes a hard-key press.

In another embodiment, the trusted element controls a keypad and a display of the mobile communication device during user authentication.

In another embodiment, the output authentication information is provided from the trusted element to a display of the mobile communication device.

In yet another embodiment, the input authentication information is received at the trusted element from a keypad of the mobile communication device.

In accordance with another embodiment of the invention, a mobile communication device includes a processing module configured to run in a plurality of operating domains. Each operating domain may be configured as an independent virtual machine. At least one of the operating domains may be a high-side domain and at least one of the operating domains may be a low-side domain. The mobile communication device also includes a trusted indicator to provide an indication of activity associated with the high-side domain. The activity may include at least one of an incoming call, and incoming text message, or a new email message. The trusted indicator may be configured to activate a user notification to indicate the activity. The mobile communication device also includes an input for switching between the low-side domain and the high-side domain. The input may be configured as an input only device that is activated by user input. The mobile communication device also includes a trusted element that is independent of either the high-side domain or the low-side domain. The trusted element may be configured to receive a signal from the input for switching between the low-side domain and the high-side domain and to perform user authentication for switching from the low-side domain to the high-side domain. The user authentication may include providing output authentication information from the trusted element to an output device and receiving input authentication information at the trusted element from an input device.

In accordance with yet another embodiment of the invention, a method for switching between domains of a mobile communication device includes providing a mobile communication device having a plurality of operating domains each operating as an independent virtual machine. At least one of the operating domains may be a high-side domain and at least one of the operating domains may be a low-side domain. The method also includes providing a trusted indicator at the mobile communication device to indicate activity associated with the high-side domain. The trusted indicator may indicate at least one of an incoming call, an incoming text, or a new email message directed to the high-side domain. The activity may be indicated by activating a user notification. The method also includes providing an input on the mobile communication device for switching from the low-side domain to the high-side domain. The input may be configured as an input only device that is activated by user input. The method also includes providing a trusted element within the mobile communication device that is independent of either the high-side domain or the low-side domain. The trusted element may be configured to receive a signal from the input for switching from the low-side domain to the high-side domain and to perform user authentication for switching from the low-side domain to the high-side domain. The user authentication may include providing output authentication information from the trusted element to an output device and receiving input authentication information at the trusted element from an input device.

Other objects, features, and advantages of the present invention will become apparent upon consideration of the following detailed description and the accompanying drawings

BRIEF DESCRIPTION OF THE DRAWINGS

FIG. 12 is a table listing categories of device drivers in accordance with an embodiment of the invention.

DETAILED DESCRIPTION OF THE INVENTION

As described herein, a goal of a multiple domain smartphone is to provide different levels of security and stability in different domains depending on the usage context and to provide an efficient and convenient way to switch between the domains without sacrificing security and stability. A further goal is to provide this capability using a commercial off-the-shelf (COTS) smartphone with only software modifications. The software modifications are intended to provide "secure" software, by which is meant that the quality and integrity of the of the software and its execution environment may provide a basis for trusting its behavior.

A multiple domain smartphone according to embodiments described herein provides many benefits. It should be understood that a viable system need not include all of the features described herein and is susceptible to various modifications and alternative forms.

Figure 1:
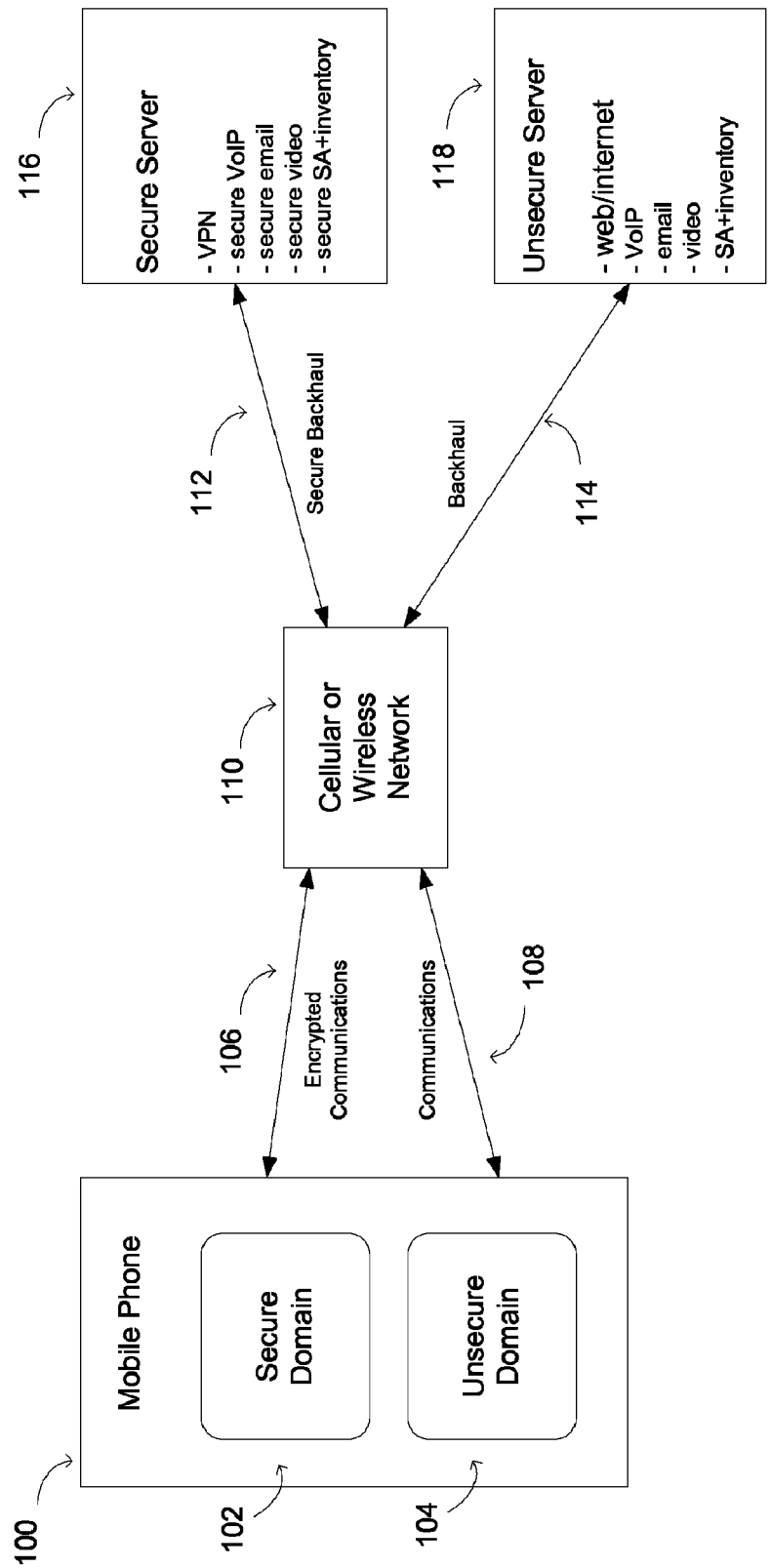
FIG. 1 is a block diagram illustrating a smartphone used in a government application.

One embodiment of the invention is described with reference to FIG. 1, which shows a simplified diagram of a secure smartphone in a government application. In FIG. 1, a mobile phone 100 may be operated in a secure domain 102 or an unsecure domain 104. The mobile phone 100 may be, for example, an Android™ smartphone or any suitable commercially available smartphone. In secure domain 102, communications 106 between mobile phone 100 and Cellular or Wireless Network 110 may be encrypted. In unsecure domain 104, communications 108 between mobile phone 100 and Cellular or Wireless Network 110 may be open. Cellular or Wireless Network 110 may then communicate to either a secure server 116 over a secure backhaul 112 or to an unsecure server 118 over an open backhaul 114.

Secure server 116 may provide services including Virtual Private Network (VPN), secure Voice over IP (VoIP), secure email, secure video and secure Situational Awareness and inventory.

Unsecure server 118 may provide services including web/internet access, VoIP, email, video and Situational Awareness and inventory.

Figure 2:
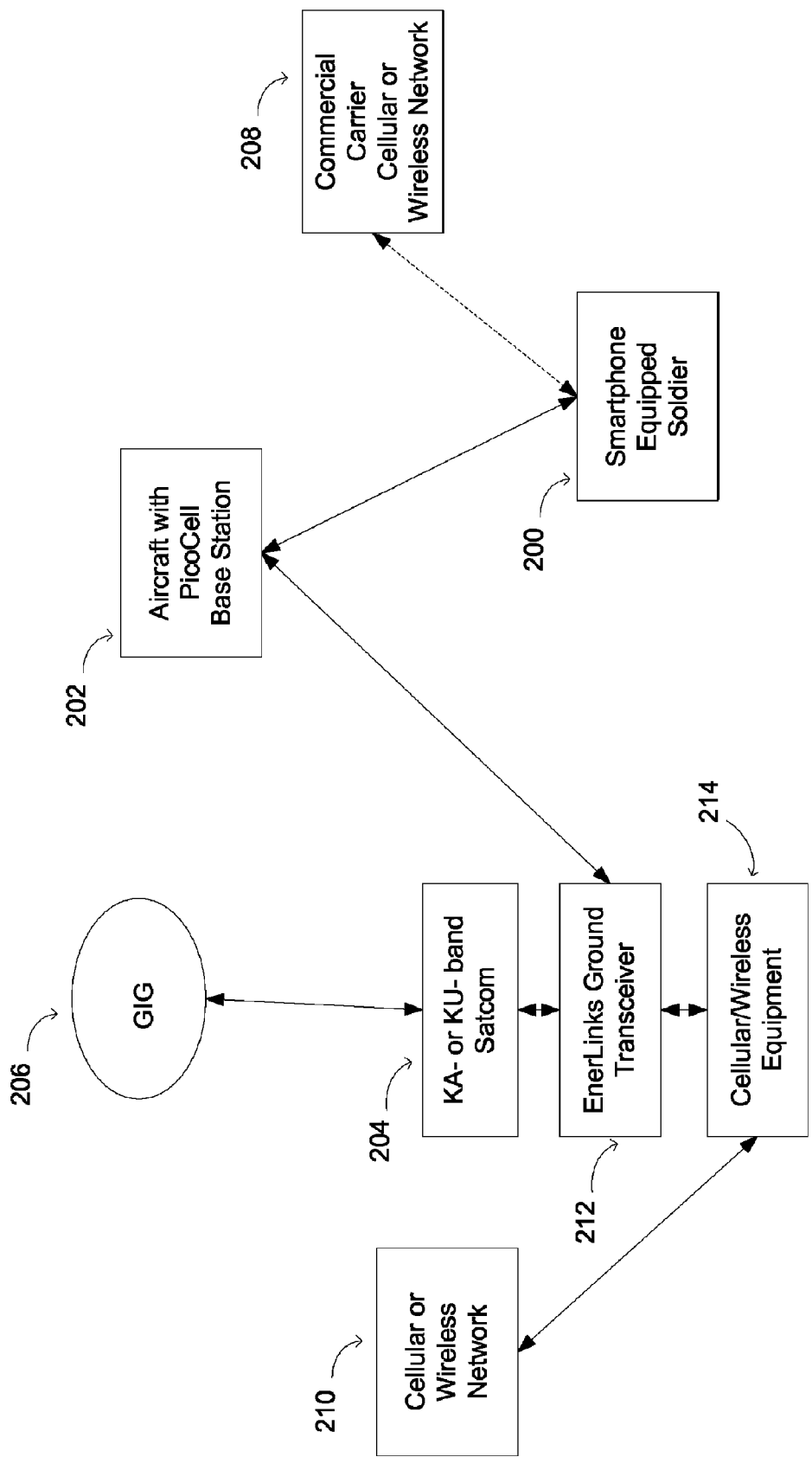
FIG. 2 is a block diagram illustrating a smartphone fielded in a government application.

FIG. 2 illustrates a real world application of the secure smartphone as it may be used on a battlefield. Smartphone equipped soldiers 200 may communicate in a secure domain to a manned or unmanned aircraft equipped with a picocell base station 202 which may then relay the communication to a Ka-band or Ku-band satellite communications unit 204 through an EnerLinks™ ground transceiver 212. The satellite communications unit 204 then relays the communications to a global information grid (GIG) 206. Alternatively, the EnerLinks™ ground transceiver 212 could relay the communication to cellular/wireless equipment 214 which may then relay the communication to a cellular or wireless network 210. The smartphone equipped soldiers 200 may also switch to an unsecure domain to communicate through a cellular or wireless network 208 operated by a commercial carrier in a nearby town. Use of a smartphone in this manner may provide greater network throughput at a fraction of the cost of traditional tactical radios.

Figure 3:
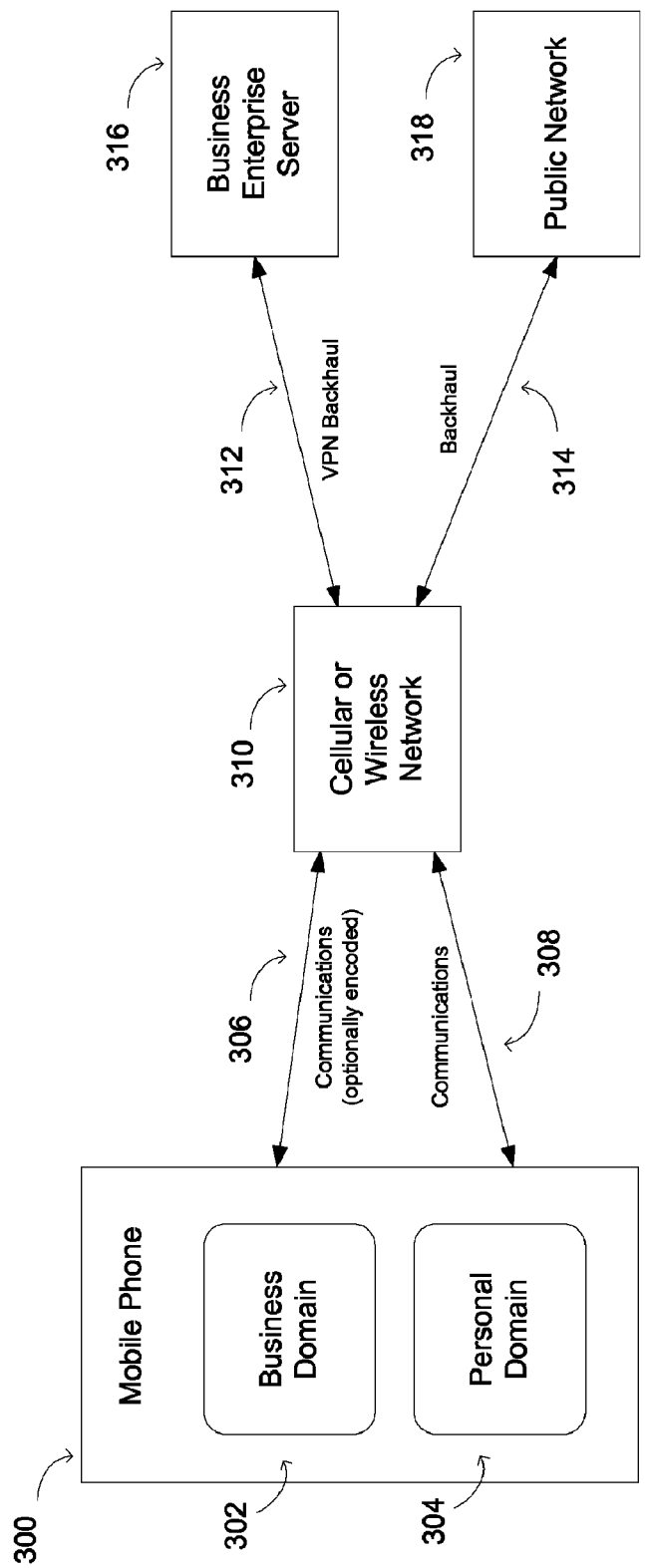
FIG. 3 is a block diagram illustrating a smartphone used in a commercial application.

An alternative embodiment of the invention is described with reference to FIG. 3, which shows a simplified diagram of a multi-domain smartphone in a commercial application. In FIG. 3, a mobile phone 300 may be operated in a business domain 302 or a personal domain 304. In business domain 302, communications 306 between mobile phone 300 and cellular or wireless network 310 may optionally be encoded. In personal domain 304, communications 308 between mobile phone 300 and cellular or wireless network 310 may be open. Cellular or wireless network 310 may then communicate to either a business enterprise server 316 associated with the business domain over a VPN backhaul 312 or to a public network 318 over an open backhaul 314.

Figure 11:
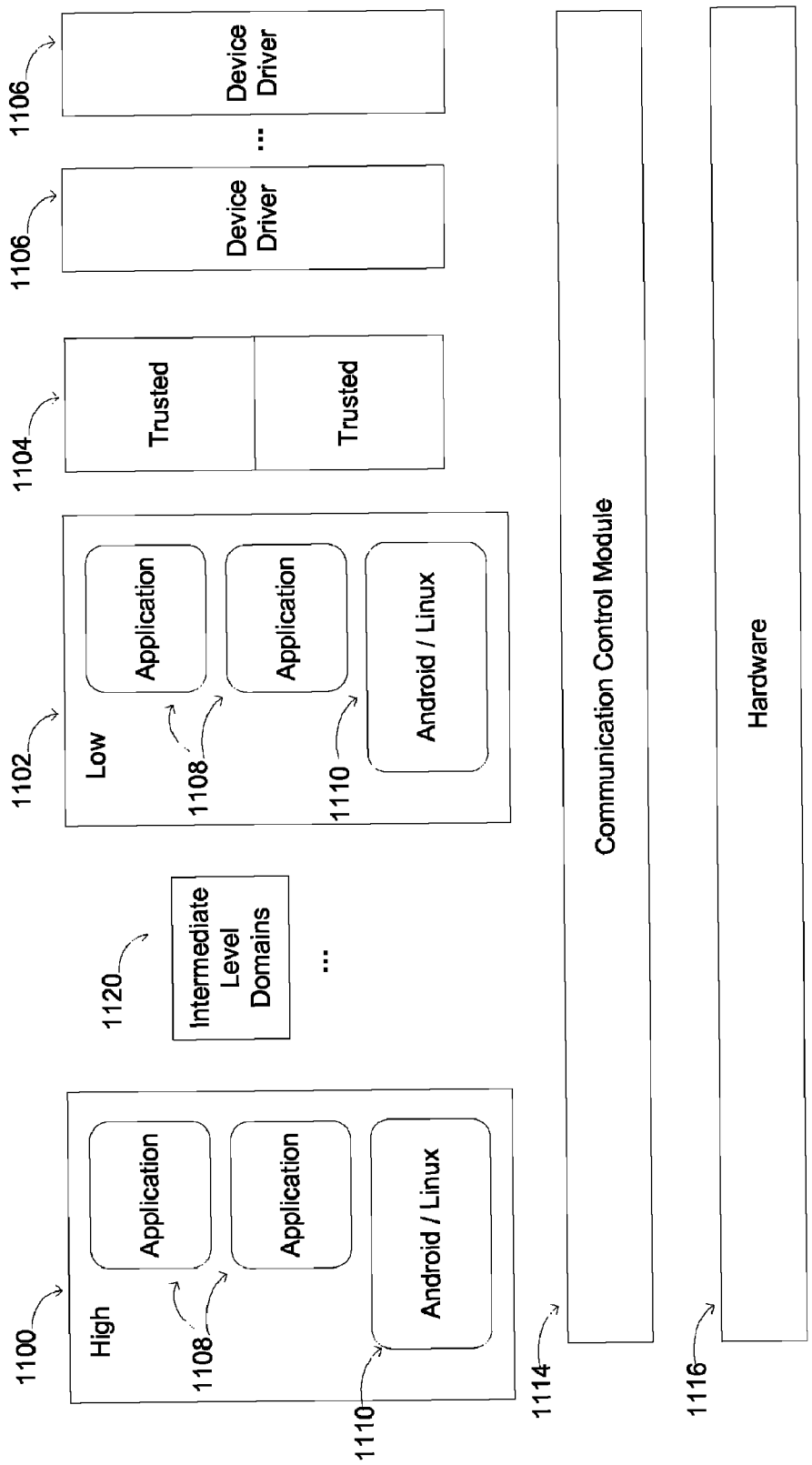
FIG. 11 is a block diagram illustrating isolated domains within a smartphone in accordance with an embodiment of the invention.

FIG. 11 illustrates a basic block diagram of the smartphone in accordance with an embodiment of the invention which will be discussed in greater detail later in the detailed description. As an introduction for the discussion that follow, the device comprises multiple isolated domains 1100, 1102, 1104 1106 and hardware 1116 which may further comprise a processing module to run operating systems 1110 and application software 1108. Each operating system 1110 may be dedicated to an operating domain such as the high domain 1100, the low domain 1102, or any number of intermediate level domains 1120. The high domain 1100 may run secure or business applications while the low domain 1102 may run unsecure or personal applications. The device also comprises a communication control module 1114 to enforce communication restrictions between each of the operating systems 1110, device drivers 1106, trusted applications 1104 and device hardware 1116. FIG. 11 presents an overview of the system and the interconnected components, each of which will be described in fuller detail below.

Provisioning

Figure 4:
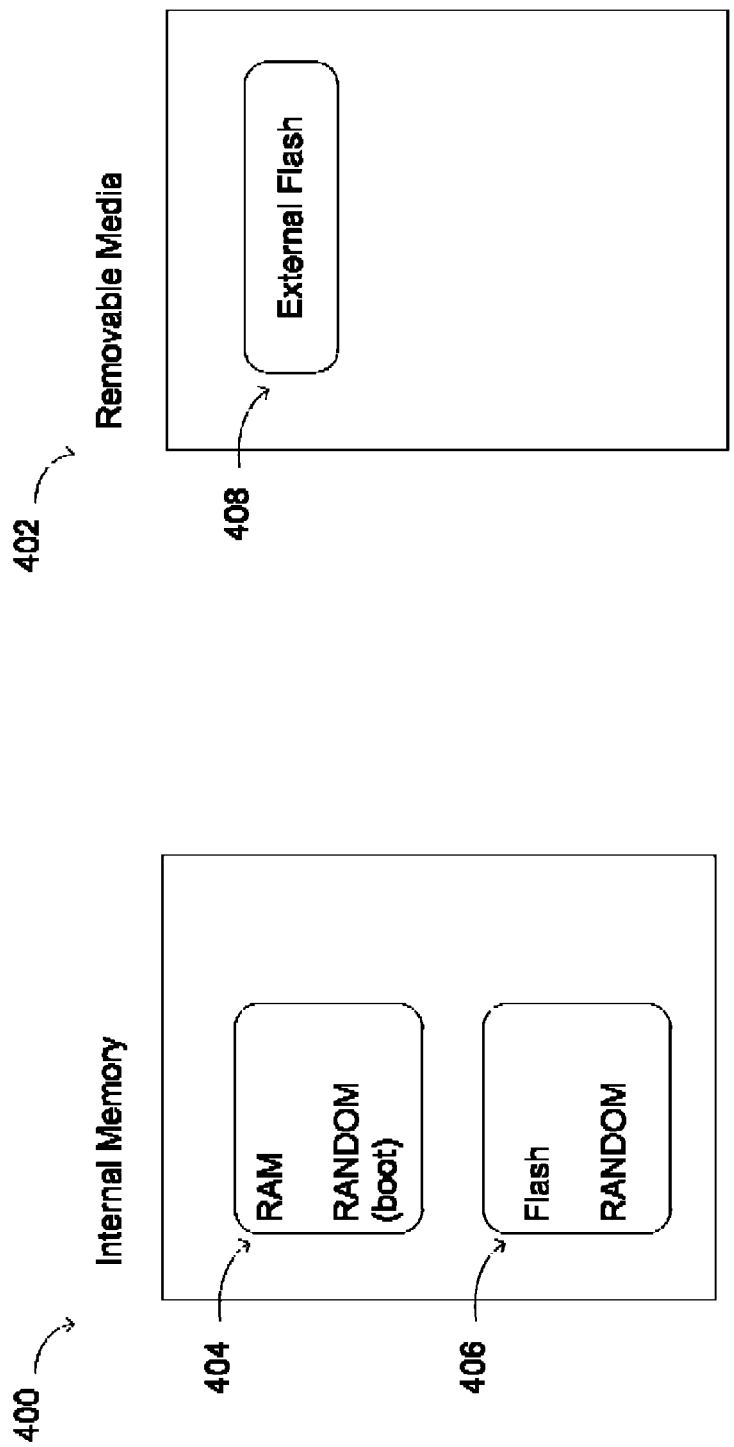
FIG. 4 is a block diagram illustrating an exemplary embodiment of the memory components of a smartphone.
Figure 5:
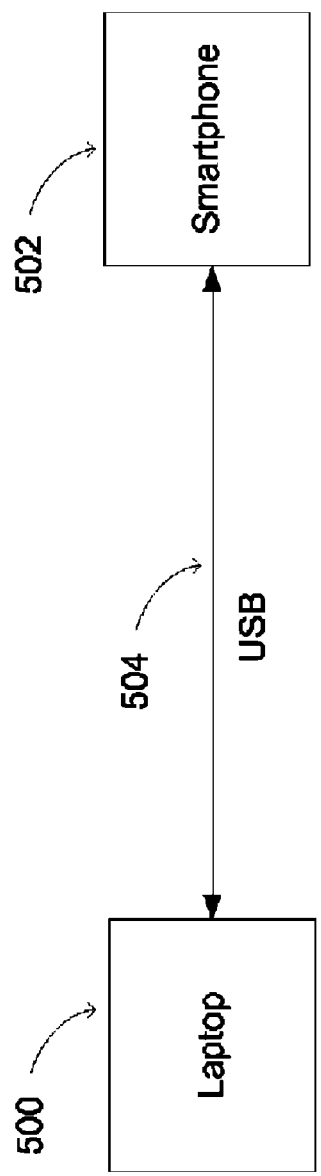
FIG. 5 illustrates a smartphone connected to a laptop computer.

Before any security measures may be effective, a newly purchased commercial phone is wiped clean and re-imaged with a secure software image. A smartphone may be provisioned by obtaining a commercially available off-the-shelf phone and performing a sequence of steps to be described. A goal of the provisioning process is to ensure that the phone is cleared of any pre-existing data and software prior to installing new applications. First, the phone may be isolated by shielding it from open WiFi access to prevent unauthorized wireless access or interference. Next, the external Flash card and SIM card, which contain cellular data network information as illustrated in FIG. 4 at 402, may be removed. An unsigned application may then be download, installed and run on the phone to overwrite and replace the boot area of the RAM memory 404. At this point Flash memory is corrupted and normal phone operations will no longer work. This may be verified later. The phone may now be rebooted with new boot code. A series of non-compressible random numbers may be downloaded over a USB port to fill all memory, such as RAM and Flash, as illustrated in FIG. 5. A hash calculation, based on a seed value, of all the random data written to memory may then be performed. If the resulting hash value matches an expected value then the phone has been verified to be clear of any previous data or software. A secure Flash image may then be downloaded and the phone rebooted, at which point the secure image takes control of the phone. If the hash value did not match, then something prevented the replacement boot software from executing and the unit cannot be secured.

Detection of Unauthorized Modification

Figure 6:
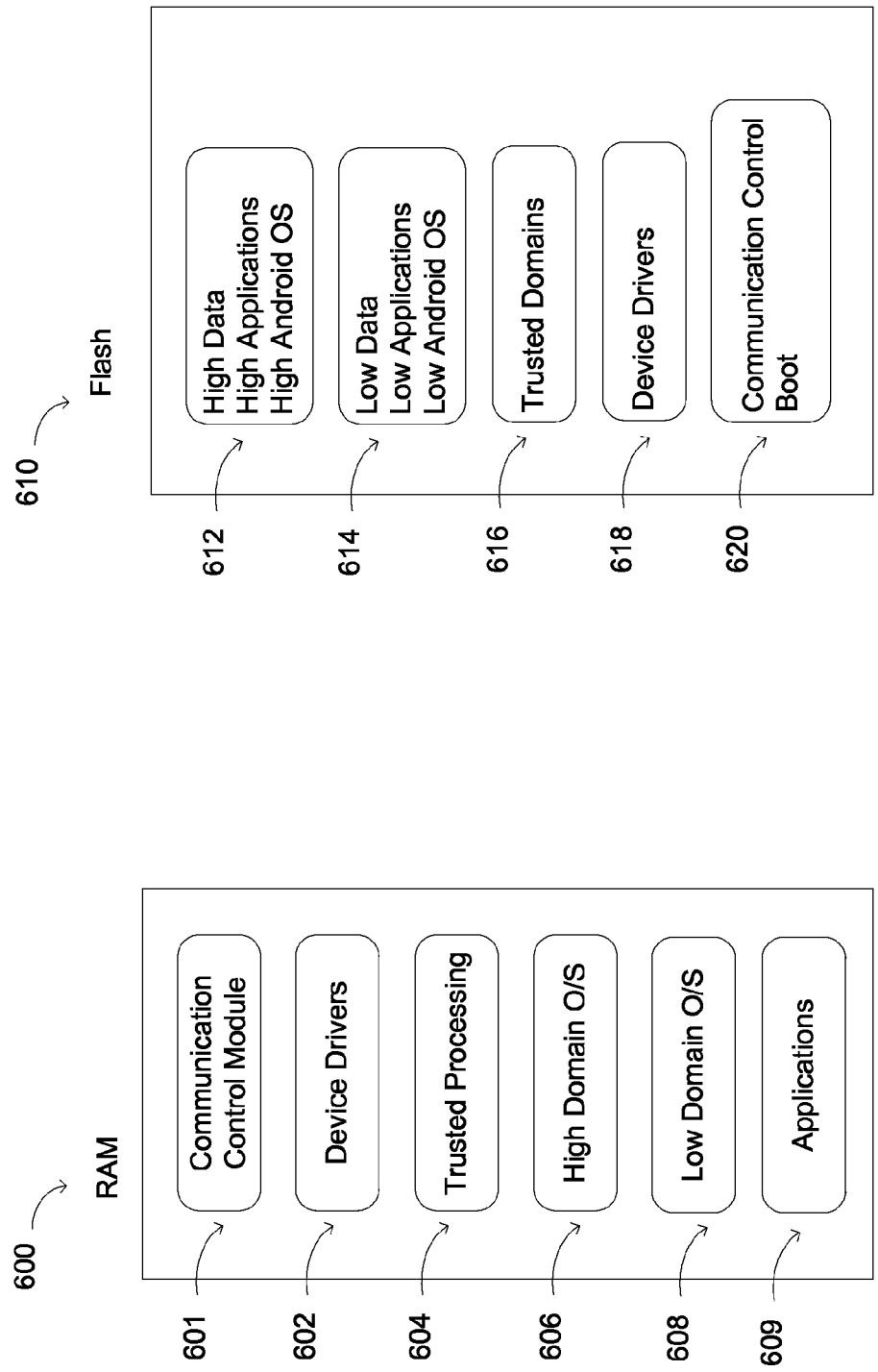
FIG. 6 illustrates an exemplary embodiment of a memory layout for a smartphone.

It may be useful to ensure that the phone has not been subject to unauthorized modification during the course of its operation or between times of usage. Although some commercial phones have varying levels of protection against this, there is no phone that cannot have its software image at least partially modified. While it may not be possible to prevent unauthorized modification without the use of custom hardware or mechanical housing, it is possible to make the process difficult and detectable. Techniques for detection of unauthorized modification may be combined with an appropriate physical possession policy to minimize the possibility of unauthorized modification. Any unauthorized modification to the contents of memory are cause for concern. FIG. 6 illustrates an example embodiment of a memory layout for the smartphone which may be useful for the discussions that follow. RAM 600 may contain communication control module 601, a device driver region 602, a trusted software region 604, a high domain O/S region 606, a low domain O/S region 608 and application region 609. Flash 610, which is non-volatile memory, may contain high domain 612 data, applications and operating system (such as an Android™ OS). Flash 610 may also contain low domain 614 data, applications and operating system (such as an Android™ OS). Flash 610 may also contain trusted domains 616, device drivers 618 and a communication control boot 620.

In one embodiment of the invention, detection of unauthorized modification may be achieved through an on-demand random challenge involving only the phone after the phone has been put into a known state via the provisioning process. In this technique, a first text-based key phrase may be entered and used as a hash seed value. The phone then performs a hash calculation over the Flash memory including the boot, trusted domains, device drivers and all operating systems. A second text-based key phrase may then be entered and split against the hash result. The split is stored in Flash memory while the second key phrase is erased from memory. Whenever the integrity of the phone needs to be verified, the first key phrase may be entered and in response, the phone calculates and displays the second key phrase based on the contents of the Flash memory. If the displayed second key phrase is the expected value then the Flash memory is unlikely to have been modified.

In another embodiment of the invention, detection of unauthorized modification may be achieved through an on-demand random challenge involving the phone and a laptop or other computer that has a copy of the original Flash image in the phone. In this technique, the laptop may request a copy of the data portion of the Flash memory for temporary safekeeping and replace those portions with random values from the laptop. The laptop may then provide a seed and request an on-demand random challenge as described in the previous technique. The laptop may then verify the results of this challenge, which the phone computes based on the random data that was just downloaded, to ensure that the challenge process has not been corrupted. If the expected hash value is produced from the challenge then there is some assurance that the phone software has not been corrupted and the laptop may then restore the data portions of Flash with the original contents that were saved.

In another embodiment of the invention, detection of unauthorized modification may be achieved through the installation of a host based integrity verification application on the phone. There may be separate integrity verification applications for each domain. The integrity verification application may be downloaded and installed through the wireless network (i.e., "over the air") or through a USB port. The integrity verification application may be signed to indicate that it comes from a trusted source or has otherwise been evaluated and approved. Thus, the integrity verification is done by means of trusted processing. The integrity verification application contains a database of expected signatures for key binary executables that may be run on the phone, as well as other specific data, and verifies the signature of each binary executable against the appropriate entry in the list of expected signatures. The list of expected signatures is itself also protected from external modification and subject to integrity checks. The integrity verification application may be run to produce an overall pass or fail indication, wherein the failure to match any signature against the corresponding expected signature would result in an overall fail indication.

In another embodiment of the invention, detection of unauthorized modification may be achieved through an on-demand certificate challenge to cryptographically detect changes in persistent memory involving only the phone and two key phrases for verification. This technique may consist of an initialization phase and a verification phase.

Figure 7:
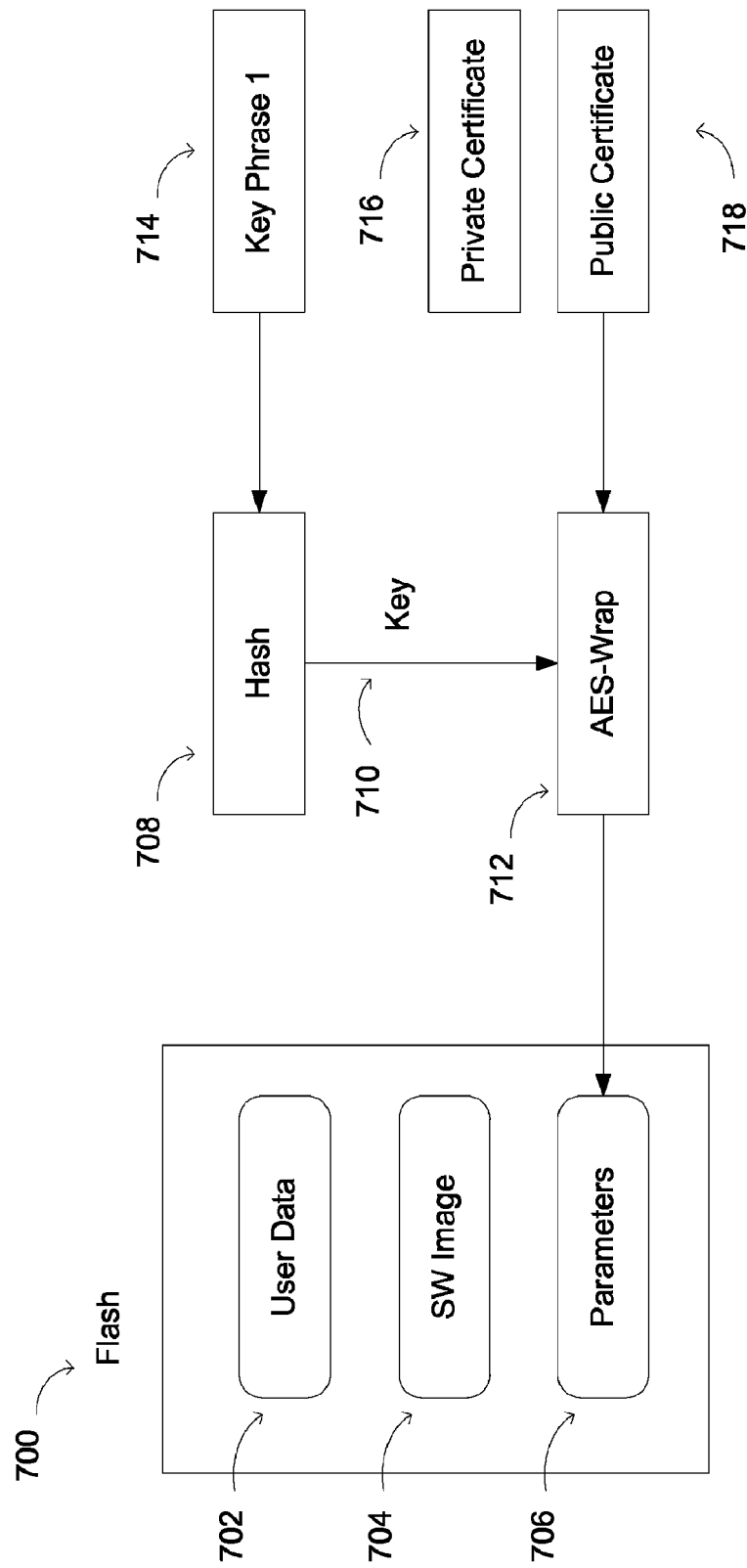
FIG. 7 is a block diagram illustrating the first part of an initialization phase for detection of unauthorized modification in accordance with an embodiment of the invention.
Figure 8:
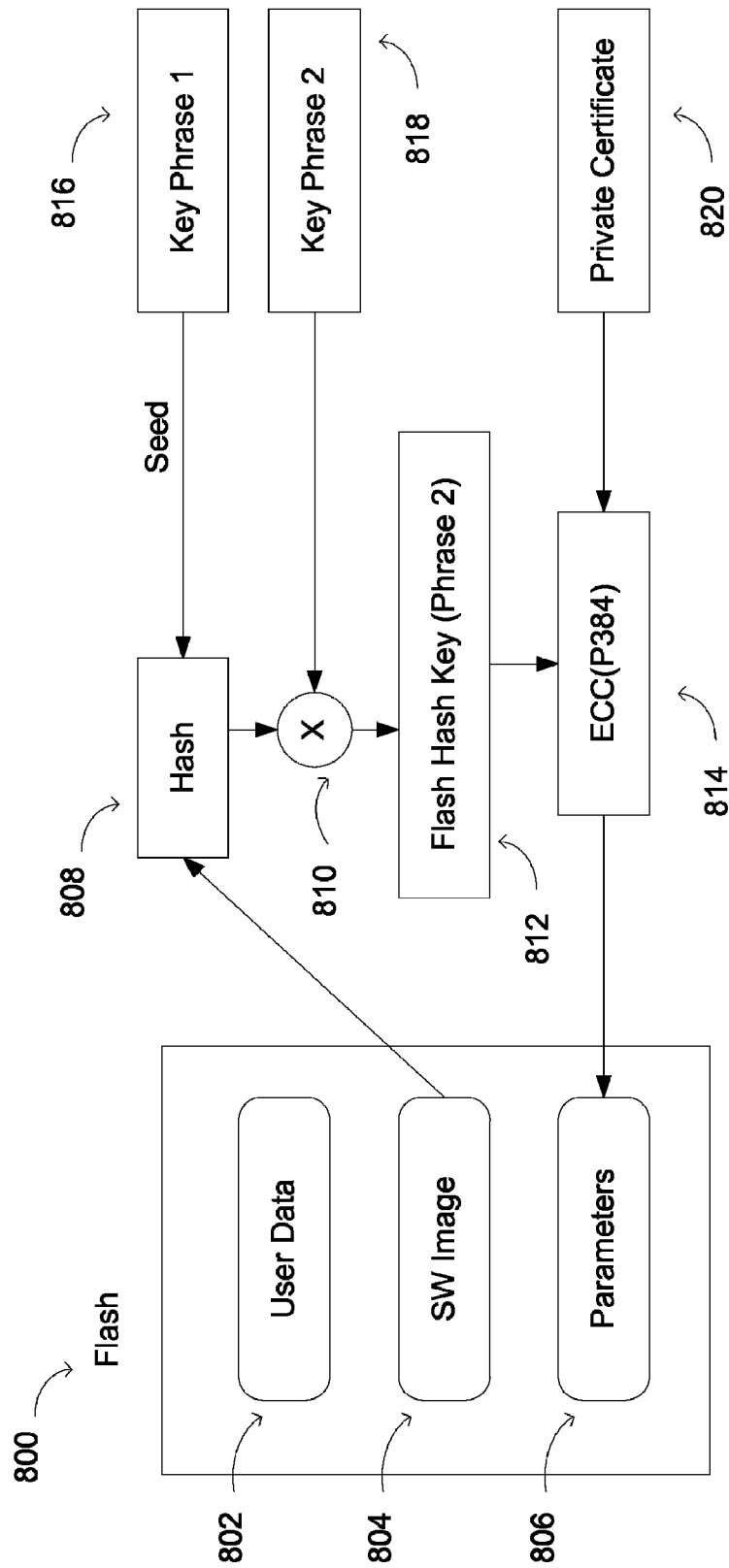
FIG. 8 is a block diagram illustrating the second part of an initialization phase for detection of unauthorized modification in accordance with an embodiment of the invention.

The initialization phase is illustrated in FIGS. 7 and 8. After the phone has been provisioned and is in a known state, private 716 and public 718 certificates may be obtained which are unique to the phone. A first text-based key phrase 714 is entered and a hash function 708 is calculated. The public certificate 718 is then AES encrypted 712 using the hash of the first key phrase 710. This encrypted public certificate is then stored in persistent memory 706.

Moving now to FIG. 8, using the first key phrase 816 as a seed, a hash function is calculated 808 over the software image 804 in Flash memory 800. The software image 804 includes the boot, trusted domains, device drivers and operating systems but excludes user data and applications. A second text-based key phrase 818 is entered and split against the Flash hash word at 810 to create a Flash hash key 812. The Flash hash key 812 is then encrypted at 814 using the private certificate 820 and stored in persistent memory 806. The private certificate 820 and the second key phrase 818 are then cleared from the phone.

Figure 9:
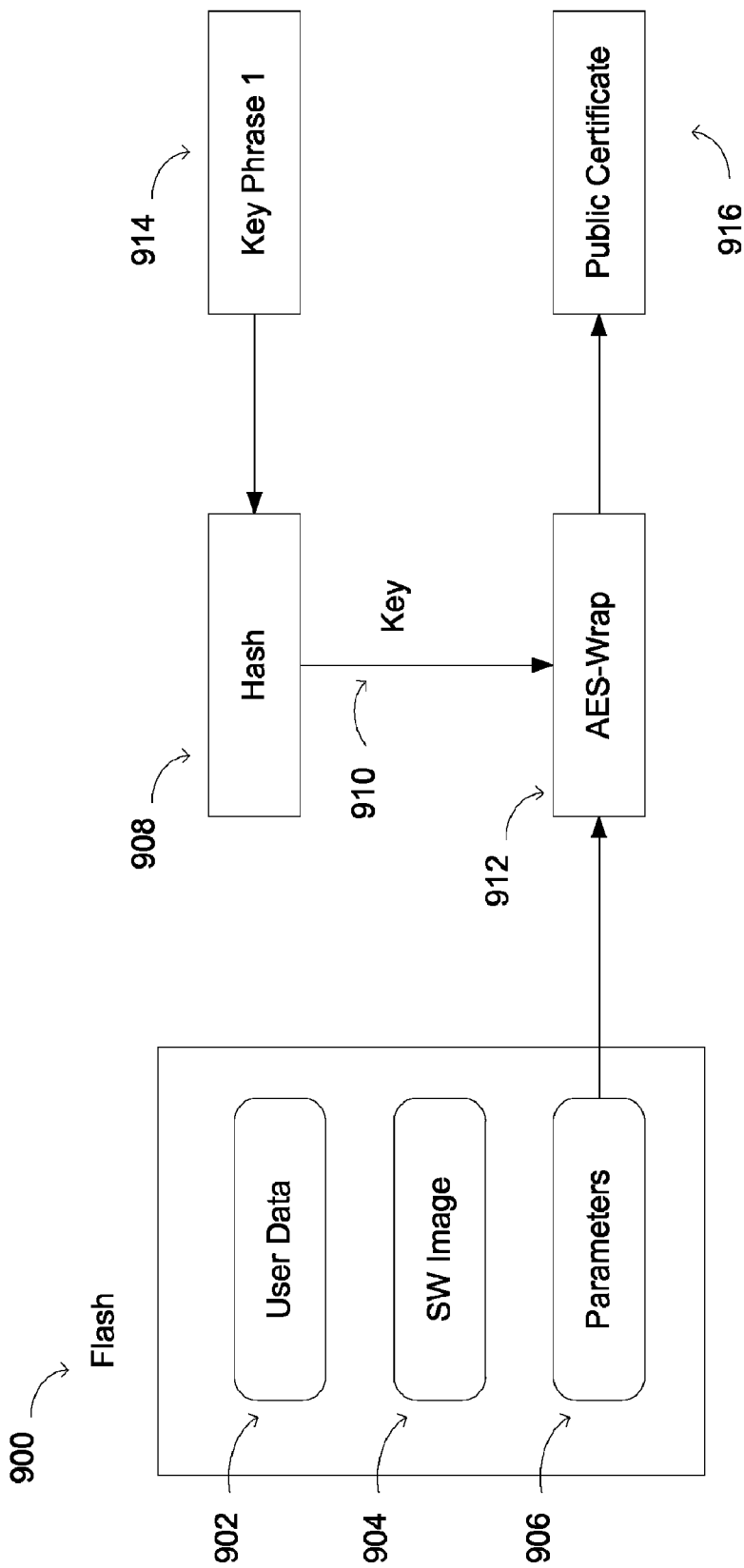
FIG. 9 is a block diagram illustrating the first part of a verification phase for detection of unauthorized modification in accordance with an embodiment of the invention.
Figure 10:
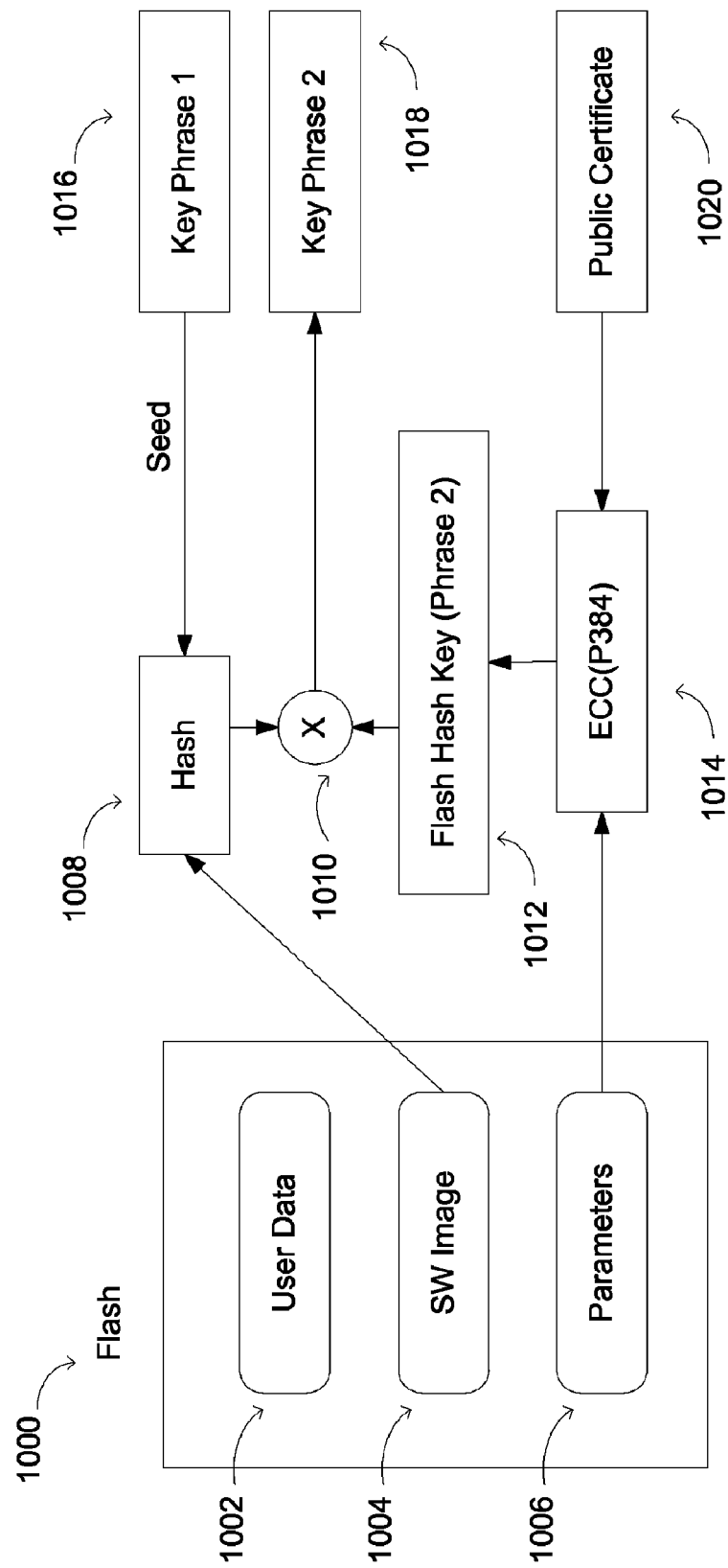
FIG. 10 is a block diagram illustrating the second part of a verification phase for detection of unauthorized modification in accordance with an embodiment of the invention.

The verification phase is illustrated in figures FIGS. 9 and 10. The user may initiate a certificate challenge by entering the first key phrase 914. A hash of the first key phrase 910 is then used as an AES key to unwrap, at 912, the encrypted public certificate stored in persistent memory 906, to reproduce the public certificate 916.

Moving now to FIG. 10, the public certificate 1020 is used to decrypt, at 1014, the Flash hash key 1012. The first key phrase 1016 is also used as a hash seed to calculate a hash 1008 over the software image 1004 in Flash memory 1000. The hash value is combined with the Flash hash key at 1010 to recover the second key phrase 1018. If the recovered second key phrase 1018 matches the expected value then the integrity of the software image 1004 has been verified.

Secure Initial State

Prior to being used for secure operations, the health of the platform may be determined and all elements of the system placed into a known state. At power up, health tests may be performed for both the hardware and the Flash memory, including software and persistent data. Power up health tests focus on establishing that the hardware environment is sound, including CPU, RAM and Flash memory, and that the software and data contents of the Flash memory are valid and authenticated. The tests may involve the CPU instruction set; CPU registers; MMU; RAM storage, address and data lines; and Flash address and data lines.

In addition to power up health tests, operational health tests may monitor the health of the hardware environment while the device is operational. These may be periodically performed in the background with minimal impact to the user functionality. These tests may involve the CPU instruction set; CPU registers; MMU; RAM storage and data lines; and before-use Flash program cyclic redundancy check (CRC).

Additionally, the identity of the user may be authenticated through a password challenge at power up, prior to entering into the operational environment. After authentication the system may be initialized by loading the communication control module, the operating system environments and trusted software.

Isolated Regions of Memory

Four isolated domains, or regions of memory, may be provided as illustrated in FIG. 11. A system high domain 1100 may provide applications 1108 and an operating system 1110, such as the Android™ or Linux™ operating system. A system low domain 1102 may provide applications 1108 and an operating system 1110, such as the Android™ or Linux™ operating system. The system low domain may be used for unclassified processing. Although only one high domain 1100 and one low domain 1102 are illustrated for simplicity, and number of each type of domain may be provided. Any number of additional intermediate level domains 1120 may also be provided. Trusted domains 1104 may be used for secure transforms, cryptographic control, security configuration, access control and secure switching and other security related software. Domains 1106 may be used for device drivers. Each domain operates as an independent virtual machine (VM). Separation is enforced between domains by a memory management unit (MMU), which is part of the phone hardware 1116, and a communication control module 1114 which configures the MMU.

The communication control module is similar to an operating system kernel except that it may only perform the tasks necessary for configuring memory separation, and inter-domain communications. This may include an application scheduler and moving data between address spaces (isolated domains or memory regions). This allows device drivers and operating systems to exist entirely in their own address space. The separation of all tasks across all operating systems present on the same processor is maintained by the communication control module.

The system high 1100 and system low 1102 domains may be complete and isolated operating systems with their own set of applications and storage. Although only one of each is shown in FIG. 11 for simplicity, there may be as many as required. Similarly, although two trusted domains 1104 are shown, there may be as many as required including redundant trusted domains.

Each domain in FIG. 11 exists as a separate Cell under the communication control module. A Cell consists of resources isolated and protected from other cells, including an address space in memory enforced by the MMU, as well as execution time on the CPU enforced by time—slicing. The protection of all cells is managed by the communication control module. The communication control module configures the MMU each time it switches focus to a new domain, allowing it access to its own resources and only those resources. The communication control module also replaces the portions of the OS in each domain, such that their schedulers may now rely on the communication control module for configuring the MMU for their sub-tasks.

Device Drivers

A goal of some embodiments of the invention is to allow the device drivers to be portable. Existing device driver binaries may be used in unmodified form. This is possible because they are wrapped with functional translation between the OS and the communication control module and because they are isolated in their own domain. Some device drivers may be wrapped with trusted software to enable switching or transformations. This may offer the advantage of allowing for rapid migration as new releases are made available. Device drivers may change implementation significantly with hardware, but the fundamental device driver interface changes infrequently.

There may be four classes of device drivers as illustrated in the table of FIG. 12. These class are switched, shared, assigned low and assigned high. Specific example of actual device drivers are provided within each class.

Figure 13:
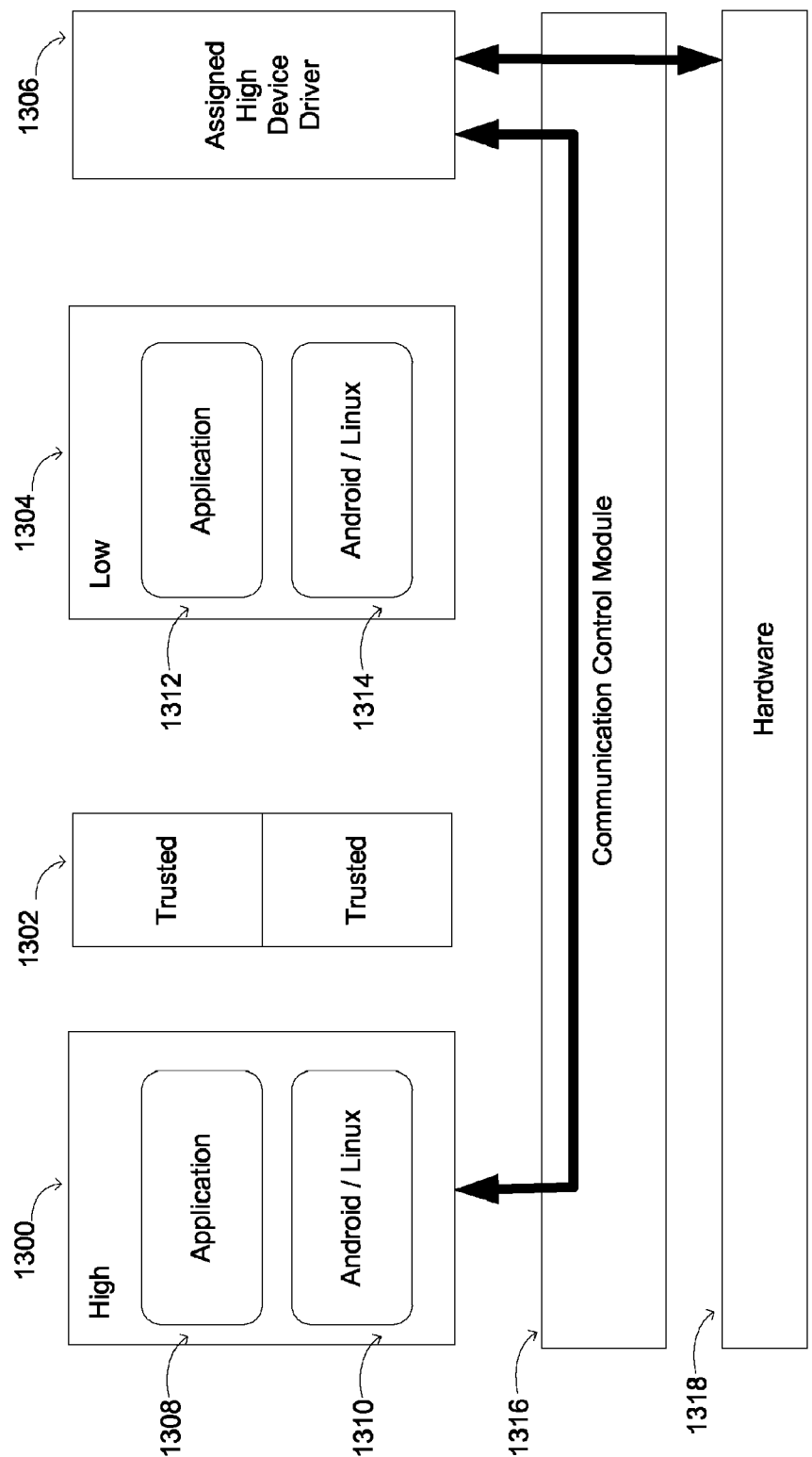
FIG. 13 is a block diagram illustrating communication with "assigned high" device drivers in accordance with an embodiment of the invention.

As illustrated in FIG. 13, physical devices assigned exclusively to the system high domain 1306 may be available only to the system high domain 1300. The data that passes through these devices may not undergo an encryption transformation. The GPS device provides precise location information about the user. In some situations it may be preferable to keep this information secret and not shared over clear channels which is why the GPS device driver may be assigned to the high domain. Device drivers in the assigned high domain may be fixed in the software image. In alternate embodiments, the assignment may be configurable by an authorized entity. Such assignment reconfiguration may require a reboot of the phone.

Figure 14:
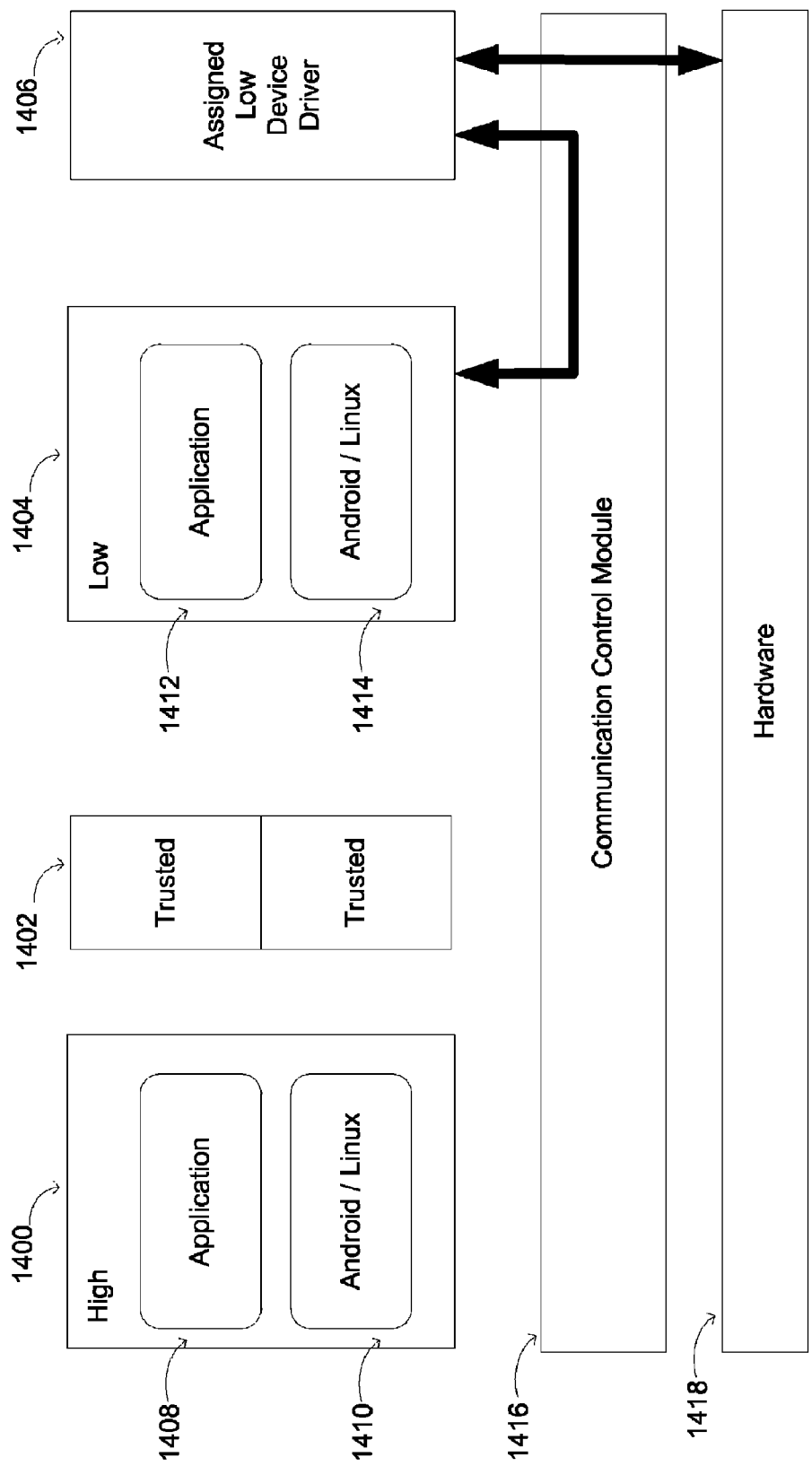
FIG. 14 is a block diagram illustrating communication with "assigned low" device drivers in accordance with an embodiment of the invention.

As illustrated in FIG. 14, physical devices assigned exclusively to the system low domain 1406 may be available only to the system low domain 1400. The data that passes through these devices typically need not undergo an encryption transformation, although in some embodiments they may undergo such a transformation if required. Devices such as the USB bus and Bluetooth need to be compatible with their existing protocol specification which may make it impractical to transform or share their data passing through the bus. Device drivers in the assigned low domain may be fixed in the software image. In alternate embodiments, the assignment may be configurable by an authorized entity. Such assignment reconfiguration may require a reboot of the phone.

Figure 15:
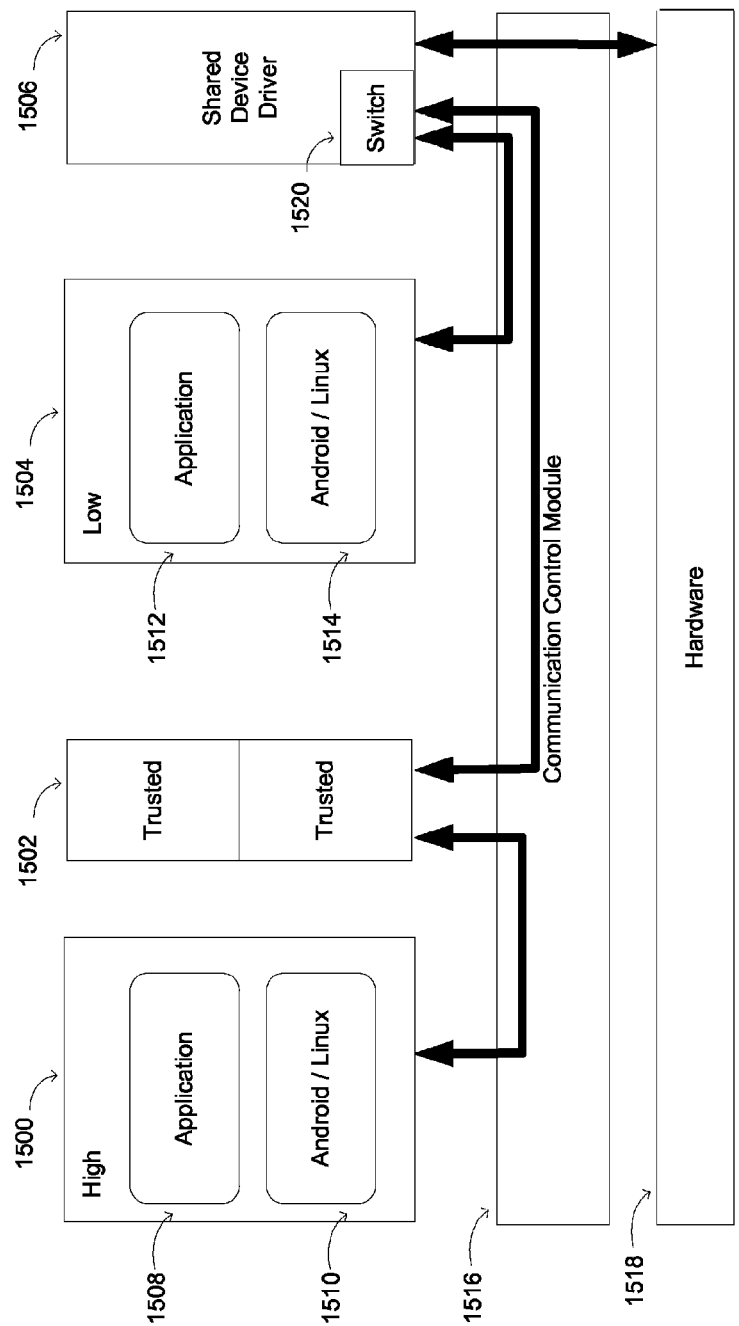
FIG. 15 is a block diagram illustrating communication with "shared" device drivers in accordance with an embodiment of the invention.

As illustrated in FIG. 15, shared devices 1506 may always be available to both high and low domains 1500 and 1504. The data that passes through these devices is encrypted data compatible with the system low domain.

The cellular data network and WiFi network are packet-switched IP networks. Packets exiting from the system high-side are first subject to an Internet Protocol Security (IPSec) transformation in a trusted domain before reaching the device driver. Packets entering and exiting the system low-side are unchanged. By sharing the device data services each domain can access the network when needed, allowing for background syncing and avoiding connection loss from network timeouts regardless of which domain is currently selected by the user. This may also allow the domain with which the user is not interacting to enter an idle, low power state, increasing battery life. This may also avoid additional latency that would otherwise be created by routing data from the system high-domain to the trusted domain to the system low-domain and then to the device driver.

The Flash storage device may be partitioned between the high domain and the low domain, allowing each access only to their own data. Data transfer from either side goes through an encryption transformation in a trusted space with each domain using a different symmetric encryption key.

Figure 16:
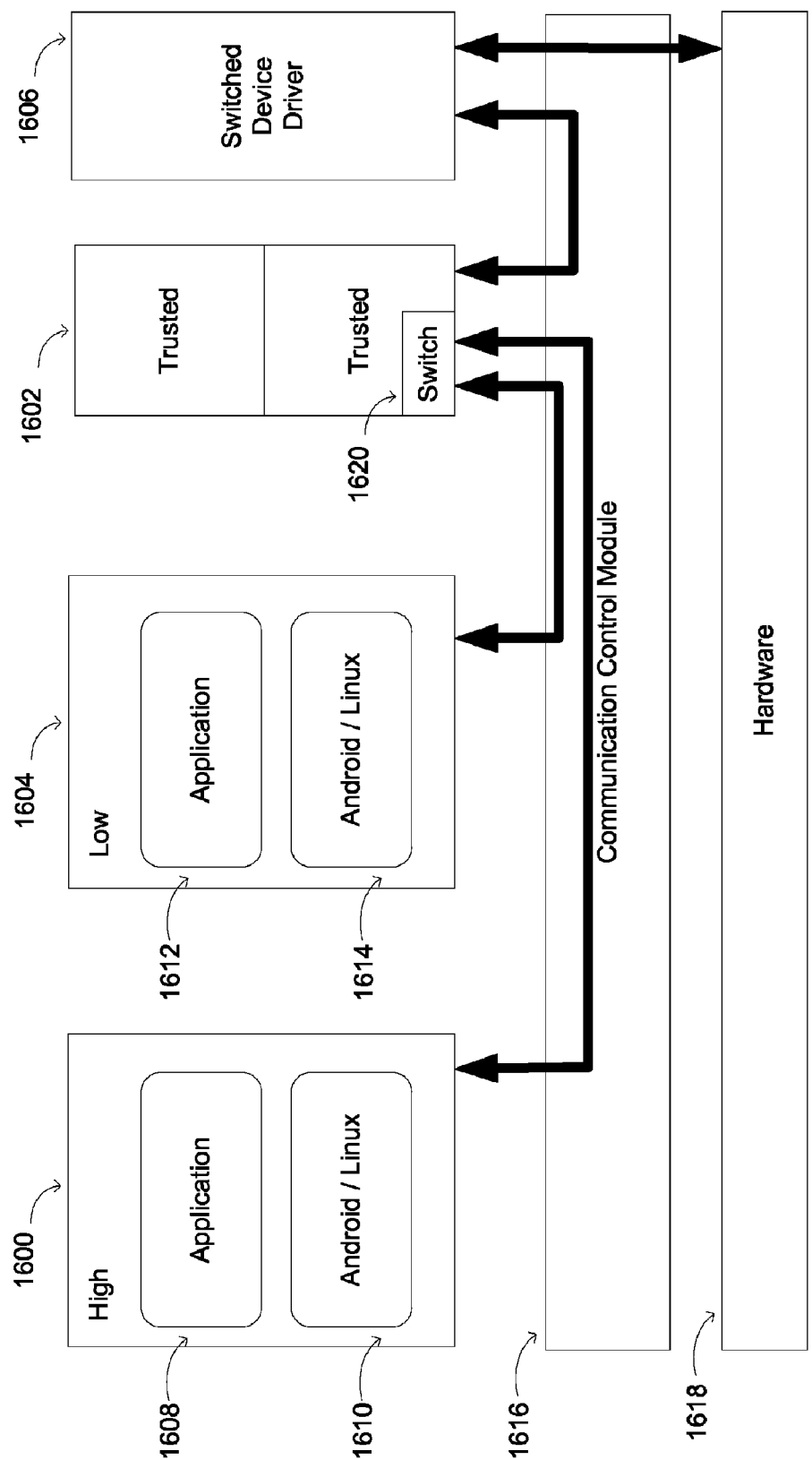
FIG. 16 is a block diagram illustrating communication with "switched" device drivers in accordance with an embodiment of the invention.

As illustrated in FIG. 16, switched devices 1606 change exclusive assignment between high and low domain 1600 and 1604 while assigned. The data that passes through these devices may not usually be encrypted. There may be an effective sanitization strategy for output devices before each switch 1620. Input devices may not need sanitization. The display and speaker are two examples of switched output devices. The sanitization consists of flushing and clearing the buffer that feeds each device driver. Since each device is write-only, the sanitization is simply to flush and clear the buffers to avoid remnant data from being mixed with new data from the other domain. The touchscreen, microphone and keypad are examples of switched input devices which do not need sanitization.

The touchscreen, display and keypad are logically grouped together since they may all need to be switched simultaneously and immediately when the user initiates a domain switch. The microphone and speaker are logically grouped together and they may not need to immediately switch when the user initiates a domain switch. This is to avoid a secure voice conversation from switching over to the low domain should the user initiate a transition to the low domain during a secure voice call.

Data at Rest

All data, when not actively in use, whether in non-volatile Flash memory or volatile RAM may require some degree of protection. All data stored in Flash memory, whether internal or external to the phone, may be encrypted immediately prior to storage to prevent unauthorized access.

If the system high domain is in a locked state, whether through timeout or overt action by the user, the RAM associated with the high domain may be sanitized for additional protection and may need to be reinstated before the high domain can resume processing. The system low domain may also be locked, but the RAM may remain untouched.

Key Management

Keys may be stored persistently. One method may use Suite B algorithms and PKI key material. Stored key material may be AES key wrapped using a key encryption key (KEK) that is split with a user password and a random value. The split KEK may then be stored in internal Flash memory (unencrypted persistent storage). This allows for a more dynamic KEK value, but is only as strong as the user password.

Keys may also be stored temporarily in internal RAM. In the event of power loss the device needs to be externally rekeyed. Locking the device may allow the keys to remain present in RAM.

Field Control and Configuration

The phone may have security parameters that can be configured, as well as trusted controls necessary to interact with the phone in a secure manner.

Figure 17:
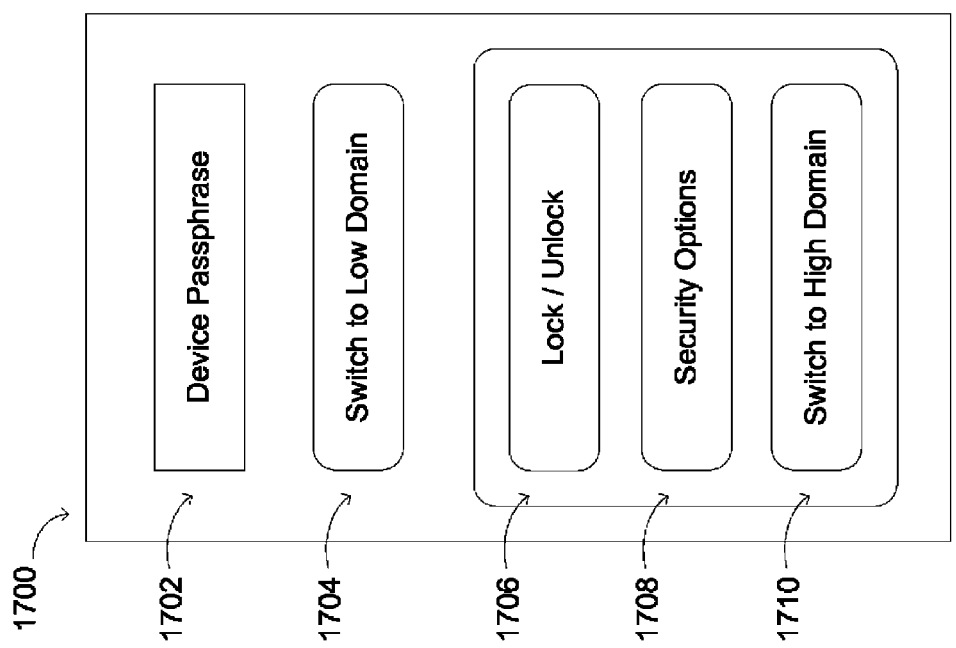
FIG. 17 illustrates an exemplary embodiment of a user interface display for access control, domain switching and security parameter configuration.
Figure 18:
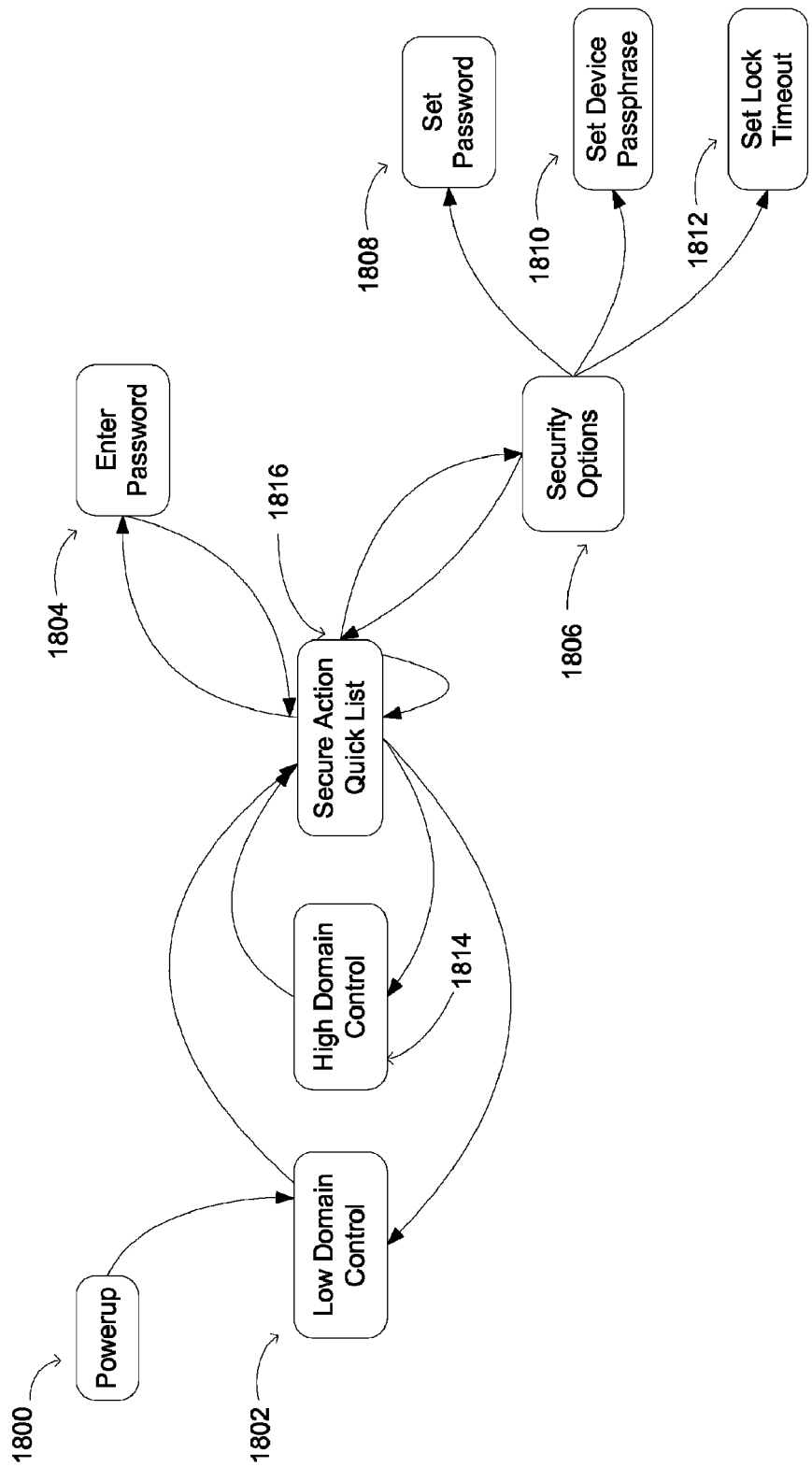
FIG. 18 illustrates a state diagram showing access control, domain switching and security parameter configuration in accordance with an embodiment of the invention.

In one embodiment of the invention, access control to the device may be provided. The access control may be a single-factor password based mechanism. Mutual authentication may be required. The procedure may be initiated by a hard-key press which is intercepted at the device driver and unseen by the OS environments. A popup dialog may be presented to the user requesting a device passphrase to authenticate the device and gain access to protected functions including setting some security options and switching to the system high domain. The passphrase may also be used to cryptographically recover stored key material. The display may appear as illustrated in FIG. 17. The popup dialog may be used to switch domains and change security parameters. FIG. 18 illustrates an example state diagram showing access control, domain switching and security parameter configuration according to some embodiments.

Both OS domains may be live and active simultaneously although isolated in RAM and Flash memory. This provides support for background synchronization. A hard-key press may be used to switch between domains. The hard key press may be captured by an input only device and processed by a trusted element at the device driver level and not forwarded to either OS. It may be undesirable to rely on an application in the high or low domain to initiate the switch since this may increase the chance of a security breach. Physical keys are preferable to virtual keys because physical key presses are discrete events that can be filtered out at the device driver level and never forwarded to the high or low domain software that may have current control over the display and keypad.

Once the user initiates a domain switch using a physical key press, the trusted device driver element notifies a trusted security element to take control of the keypad and display, which may then present the user with a two-way authentication prompt. Identity management relies on a mutual authentication scheme. The trusted element displays a device passphrase on the screen, which the user may recognize as having been previously entered, and then presents the user with a short menu of options. The display may be trusted because (1) the key press was intercepted at a low level device driver before entering either domain and (2) the display presented a shared secret device passphrase to the user which is not accessible by any software outside of the trusted domain.

Some actions may require the user to enter their password to perform the action. The action may be trusted to have been performed because the phone first authenticated itself as the trusted portion. Some actions may also be limited to only certain users who have the authentication credentials. Once authenticated, the user can switch between domains or perform security actions more quickly without entering credentials repeatedly, until either a timeout or overt lock occurs. Some rare and important security actions may require a password every time. There may also be an additional menu option for certain users to gain access to more advanced settings to which other users do not have access.

Some switched device drivers may lag or not switch. For example, it may be undesirable for the speaker and microphone to switch domains during a call in progress.

Field updates and maintenance may include software updates. Trusted portions of software may be updated under restriction controls including the requirement that the updates be signed. The system high side may benefit from signed software which has been evaluated. The system low side may benefit from compatibility with existing commercial standards such as, for example, the Android™ or Google™ marketplace.

The device may be disposed of when no longer needed or repurposed. All information in the phone can be sanitized by following the provisioning process described previously. The phone may then either be returned to the original default Android™ image, for example, or to a new secure image. In the event of accidental loss or theft, a remote sanitization capability may be provided in some embodiments.

Figure 19:
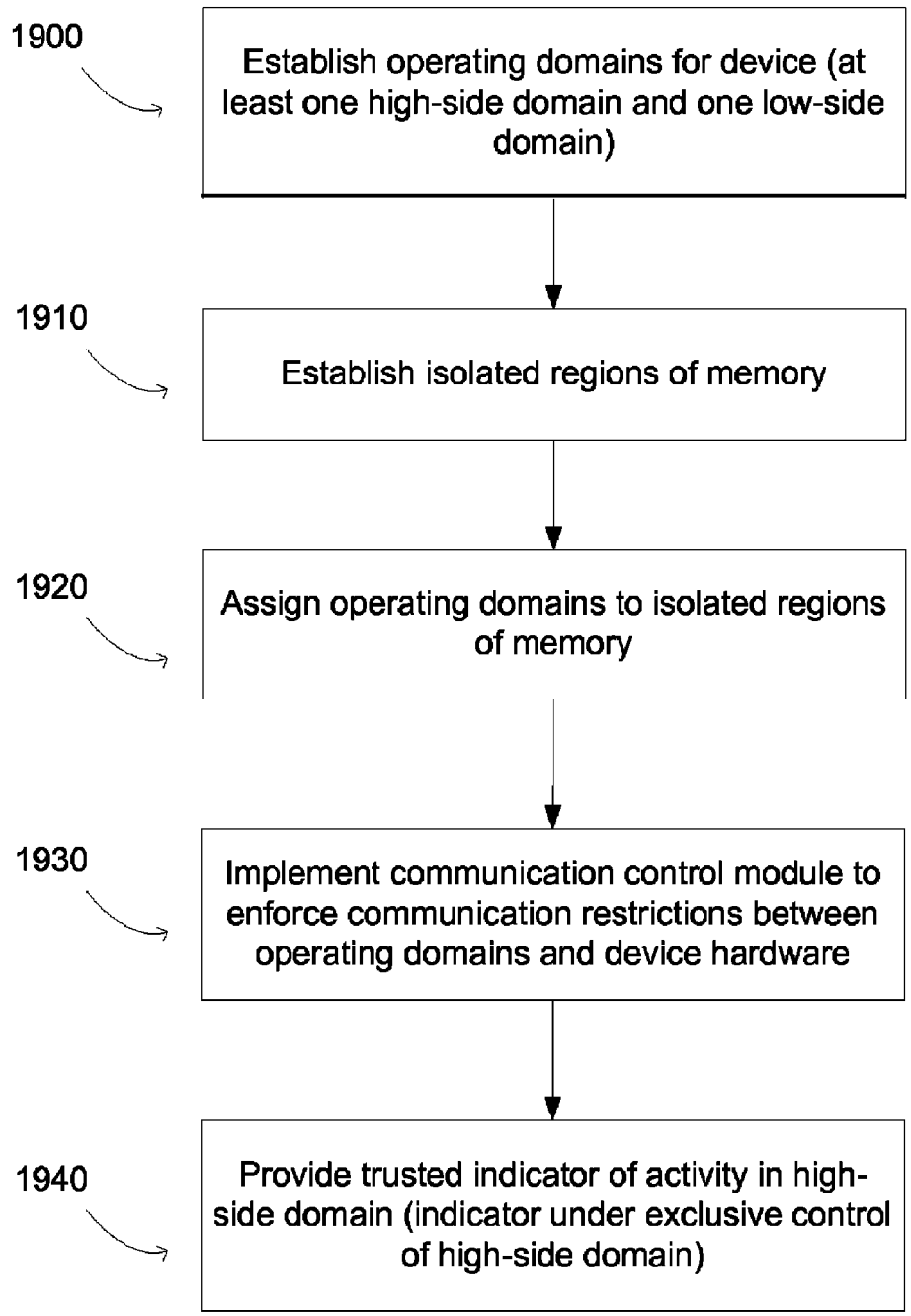
FIG. 19 illustrates a procedure for indicating activity across operating domains of a mobile communication device in accordance with some embodiments.

FIG. 19 illustrates a procedure for indicating activity across operating domains of a mobile communication device in accordance with some embodiments. Operation 1900 comprises establishing operating domains for the device. At least one of the domains may be a high-side domain and at least one of the domains may be a low-side domain. It may be advantageous to notify a user of the device of activity in the high-side domain while the device is operating in the low-side domain so that the user may switch domains if desired. Operation 1910 comprises establishing isolated regions of memory on the device. Operation 1920 comprises assigning operating domains to the isolated regions of memory.

Operation 1930 comprises implementing a communication control module to enforce communication restrictions between software associated with each of the operating domains and device hardware. The communication control module may be used to prevent corruption or unauthorized modification of software or data between domains as well as to prevent access of high-side domain data by a low-side domain application. Each domain operates as an independent virtual machine and separation is enforced between domains by a memory management unit which is part of the device hardware and is configured by the communication control module.

Operation 1940 comprises providing a trusted indicator of activity in the high-side domain. In some embodiments activity may include incoming calls, incoming text messages or arrival of mail. The trusted indicator may be under the exclusive control of software that operates in high-side domain.

Figure 20:
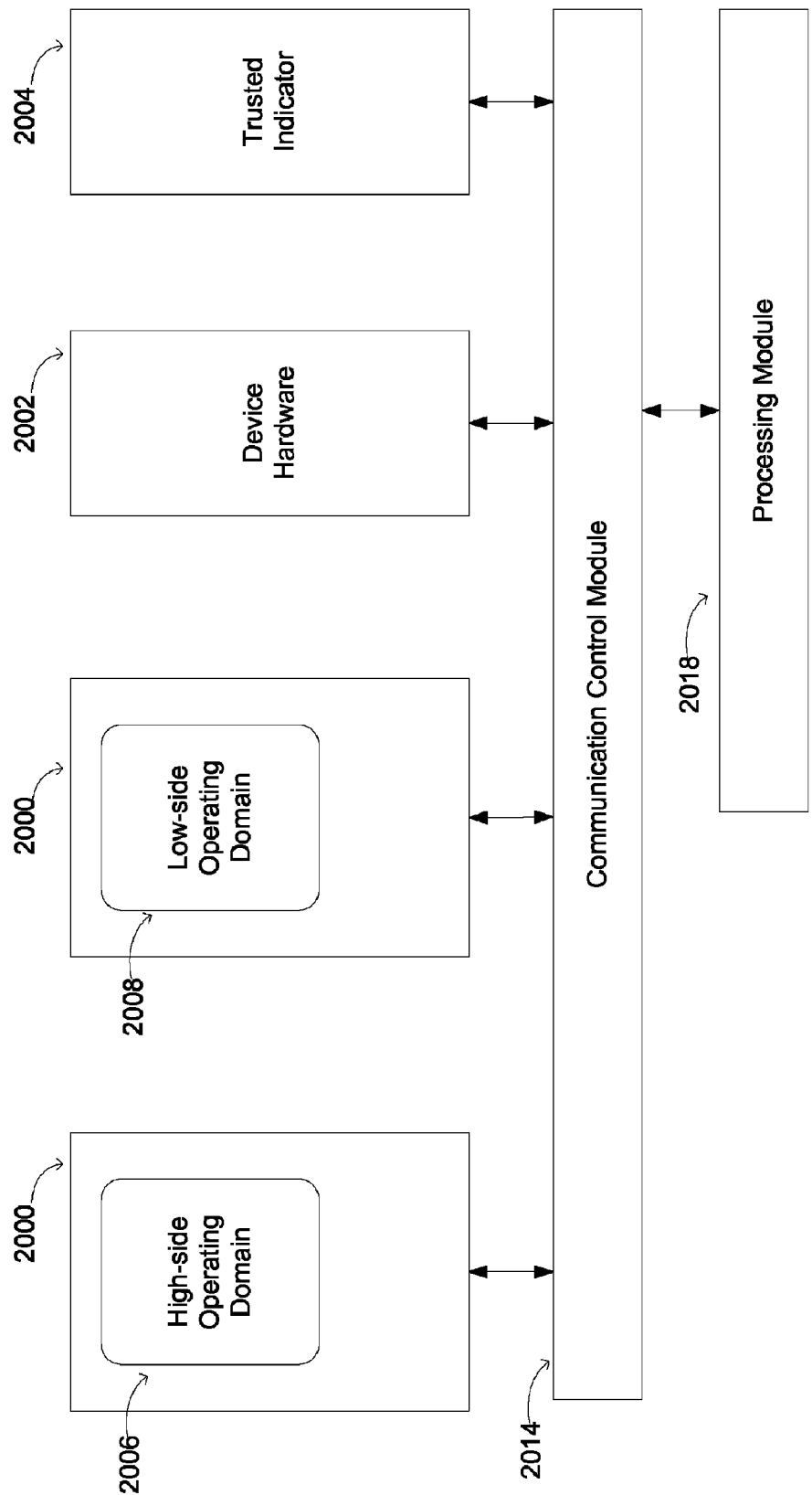
FIG. 20 illustrates a functional block diagram of a mobile communication device configured to operate in multiple domains in accordance with some embodiments.

FIG. 20 illustrates a functional block diagram of a mobile communication device configured to operate in multiple domains in accordance with some embodiments. The term module may comprise hardware, software or a combination of both. The device comprises multiple isolated regions of memory 2000 and a processing module 2018 to run operating domains 2006. At least one of the domains may be a high-side domain 2006 and at least one of the domains may be a low-side domain 2008.

The device also comprises a processing module instantiated communication control module 2014 to enforce communication restrictions between software associated with each of the operating domains 2006 and 2008 and device hardware 2002. The communication control module may be used to prevent corruption or unauthorized modification of software or data between domains as well as to prevent access of high-side domain data by a low-side domain application. Each domain operates as an independent virtual machine and separation is enforced between domains by a memory management unit which is part of the device hardware and is configured by the communication control module.

Trusted indicator 2004 may provide an indication of activity in the high-side operating domain and may be under the exclusive control of software that operates in the high-side domain. Trusted indicator 2004 may be an LED on the device.

What is claimed is:

1. A method performed on a mobile communication device such that during operation the mobile communication device can indicate activity associated with an operating domain on the mobile communication device, the method comprising:

establishing a plurality of operating domains for the mobile communication device each operating as an independent virtual machine, wherein at least one of the operating domains is a high-side domain and at least one of the operating domains is a low-side domain, the high-side domain being a secure domain and the low-side domain being an unsecure domain;

providing a trusted indicator at the mobile communication device for indicating activity associated with the high-side domain, the activity including at least one of an incoming call, an incoming text, or a new email message, the trusted indicator configured to activate a user notification to indicate the activity;

providing an input on the mobile communication device for switching from the low-side domain to the high-side domain, the input configured as an input only device that is activated by user input, wherein after switching to the high-side domain, previous activity on the low-side domain is preserved; and providing a trusted element for the mobile communication device that is independent of either the high-side domain or the low-side domain, the trusted element configured to:

receive a signal from the input for switching from the low-side domain to the high-side domain;

perform user authentication for switching from the low-side domain to the high-side domain, the user authentication including providing output authentication information from the trusted element to an output device and receiving input authentication information at the trusted element from an input device; and control a keypad and a display of the mobile communication device during the user authentication, the keypad configured to provide the input authentication information to the trusted element and the display configured to receive the output authentication information from the trusted element.

2. The method of claim 1, wherein the user notification activated by the trusted indicator is a light emitting diode (LED) on the mobile communication device.

3. The method of claim 1, wherein the input on the mobile communication device for switching from the low-side domain to the high-side domain includes a hard-key press.

4. The method of claim 1, wherein the output authentication information is provided from the trusted element to a display of the mobile communication device.

5. The method of claim 1, wherein the input authentication information is received at the trusted element from a keypad of the mobile communication device.

6. A mobile communication device configured to operate in multiple domains, the mobile communication device comprising:

a processing module configured to run in a plurality of operating domains, each operating domain configured as an independent virtual machine, wherein at least one of the operating domains is a high-side domain and at least one of the operating domains is a low-side domain, the high-side domain being a secure domain and the low-side domain being an unsecure domain;

a trusted indicator to provide an indication of activity associated with the high-side domain, the activity including at least one of an incoming call, an incoming text message, or a new email message, the trusted indicator configured to activate a user notification to indicate the activity;

an input for switching between the low-side domain and the high-side domain, where after switching to the high-side domain, previous activity on the low-side domain is preserved, the input configured as an input only device that is activated by user input; and a trusted element that is independent of either the high-side domain or the low-side domain, the trusted element configured to:

receive a signal from the input for switching between the low-side domain and the high-side domain;

perform user authentication for switching from the low-side domain to the high-side domain, the user authentication including providing output authentication information from the trusted element to an output device and receiving input authentication information at the trusted element from an input device; and control a keypad and a display of the mobile communication device during the user authentication, the keypad configured to provide the input authentication information to the trusted element and the display configured to receive the output authentication information from the trusted element.

7. The mobile communication device of claim 6, wherein the user notification activated by the trusted indicator is an LED on the mobile communication device.

8. The mobile communication device of claim 6, wherein the input on the mobile communication device for switching from the low-side domain to the high-side domain includes a hard-key press.

9. The mobile communication device of claim 6, wherein the output authentication information is provided from the trusted element to a display of the mobile communication device.

10. The mobile communication device of claim 6, wherein the input authentication information is received at the trusted element from a keypad of the mobile communication device.

11. A method of preparing a mobile communication device such that a user can securely switch between operating domains of the mobile communication device, the method comprising:

providing a mobile communication device having a plurality of operating domains each operating as an independent virtual machine, wherein at least one of the operating domains is a high-side domain and at least one of the operating domains is a low-side domain, the high-side domain being a secure domain and the low-side domain being an unsecure domain;

providing a trusted indicator at the mobile communication device to indicate activity associated with the high-side domain, the trusted indicator indicating at least one of an incoming call, an incoming text, or a new email message directed to the high-side domain, the activity indicated by activating a user notification;

providing an input on the mobile communication device for switching from the low-side domain to the high-side domain, the input configured as an input only device that is activated by user input, wherein after switching to the high-side domain, previous activity on the low-side domain is preserved;

providing a trusted element within the mobile communication device that is independent of either the high-side domain or the low-side domain, the trusted element configured to:

receive a signal from the input for switching from the low-side domain to the high-side domain; and perform user authentication for switching from the low-side domain to the high-side domain, the user authentication including providing output authentication information from the trusted element to an output device and receiving input authentication information at the trusted element from an input device; and control a keypad and a display of the mobile communication device during the user authentication, the keypad configured to provide the input authentication information to the trusted element and the display configured to receive the output authentication information from the trusted element.

12. The method of claim 11, wherein user notification activated by the trusted indicator is a light emitting diode (LED) on the mobile communication device.

13. The method of claim 11, wherein the input on the mobile communication device for switching from the low-side domain to the high-side domain includes a hard-key press.

14. The method of claim 11, wherein the output authentication information is provided from the trusted element to a display of the mobile communication device.

15. The method of claim 11, wherein the input authentication information is received at the trusted element from a keypad of the mobile communication device.

* * * * *